United States Patent [19]
Sumner

[11] 3,835,904
[45] Sept. 17, 1974

[54] APPARATUS FOR LAMINATING WOODEN STRIPS

[76] Inventor: John S. Sumner, 728 N. Sawtelle Ave., Tucson, Ariz. 85716

[22] Filed: Apr. 5, 1973

[21] Appl. No.: 348,334

[52] U.S. Cl. ............... 144/313, 144/3 R, 144/256, 144/259, 144/315 A, 144/265, 156/223, 269/246, 269/265
[51] Int. Cl. .................. B27g 11/00, B27h 1/00
[58] Field of Search .................. 269/246, 152, 265; 144/3 R, 254, 255, 256, 257, 258, 269, 288, 264, 265, 313, 270, 259, 266, 315 R, 315 A, 317, 314 R; 156/221, 222, 223

[56] References Cited
UNITED STATES PATENTS

| | | | |
|---|---|---|---|
| 1,174,276 | 3/1916 | Goodman & Dickason | 144/266 X |
| 2,168,280 | 8/1939 | Klemm | 144/259 |
| 2,418,438 | 4/1947 | Watts | 156/222 |
| 2,510,602 | 6/1950 | Pedersen | 156/222 X |
| 2,567,122 | 9/1951 | Radig | 144/265 |
| 2,799,307 | 7/1957 | Nickol | 156/221 X |

Primary Examiner—Andrew R. Juhasz
Assistant Examiner—W. D. Bray
Attorney, Agent, or Firm—Warren F. B. Lindsley

[57] ABSTRACT

An apparatus for forming laminated beams by pressing freshly glued strips against a rigid frame or elastic beam by an elastic steel beam. The elastic steel beam is provided with a radius of curvature somewhat different from that of the rigid frame so that when the beam is pressed against the laminated strips a bending movement is present over the full length of the beam, which bending movement produces a substantially uniform pressure against the laminated strips. Pressure blocks are provided which are adjustable in position along the length of the laminated strips.

16 Claims, 7 Drawing Figures

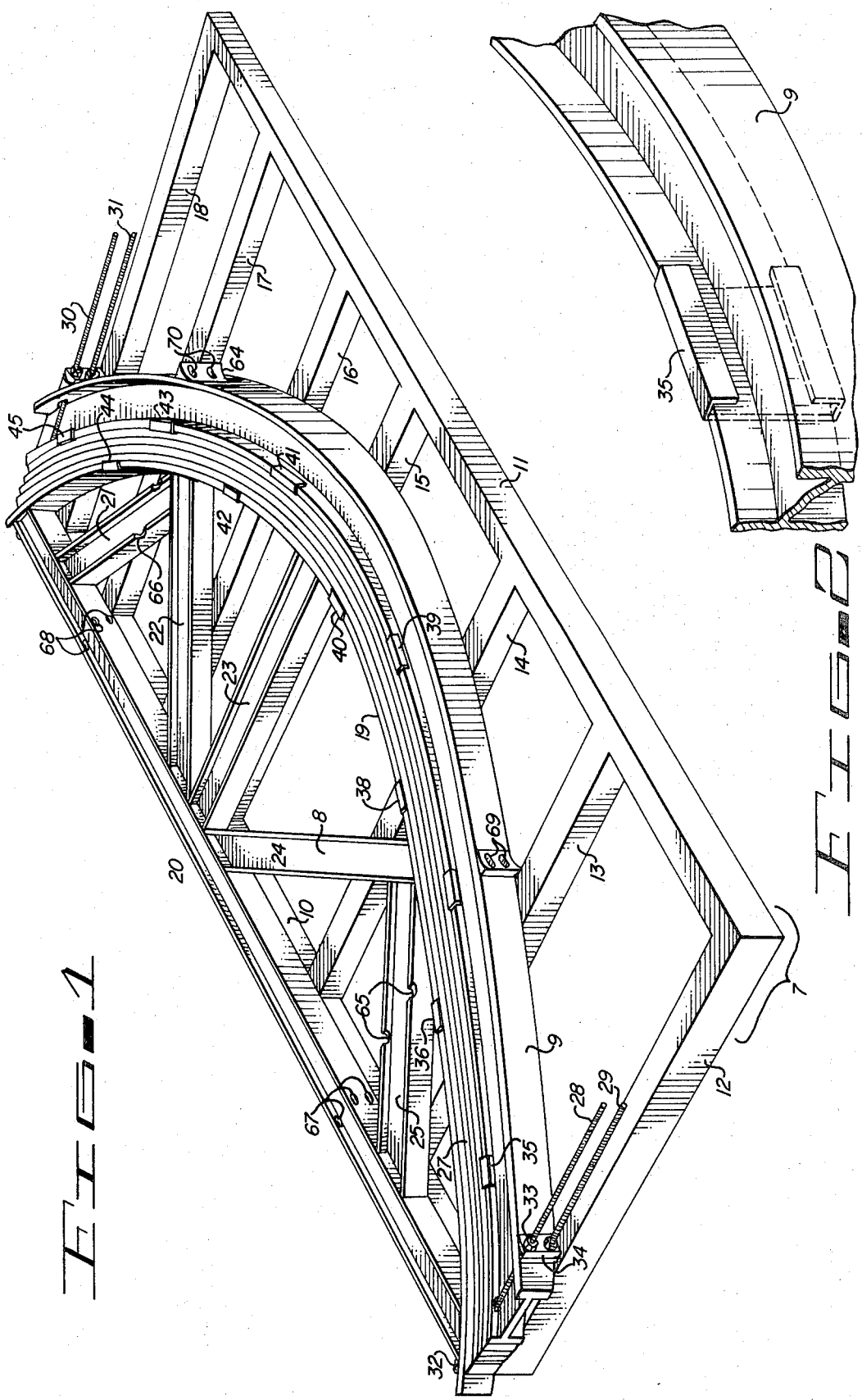

PATENTED SEP 17 1974 3,835,904
SHEET 2 OF 3
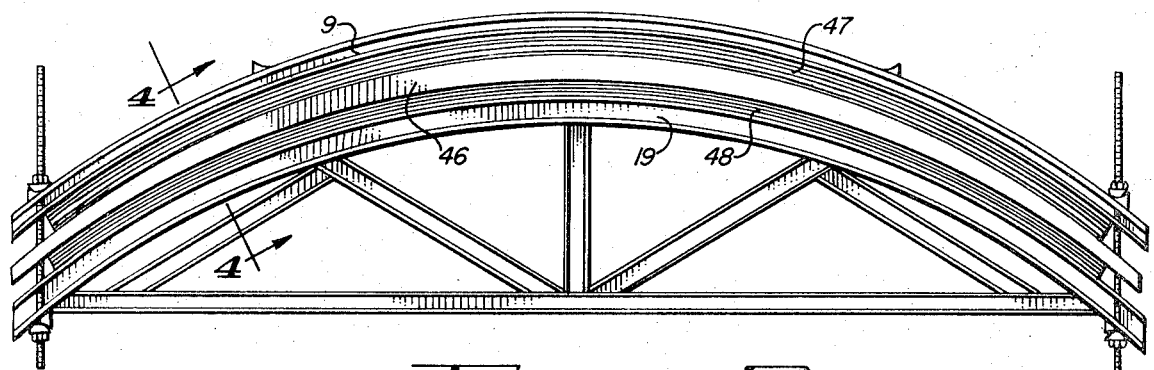
Fig-3
Fig-4
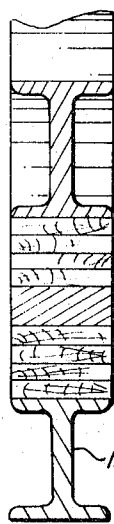
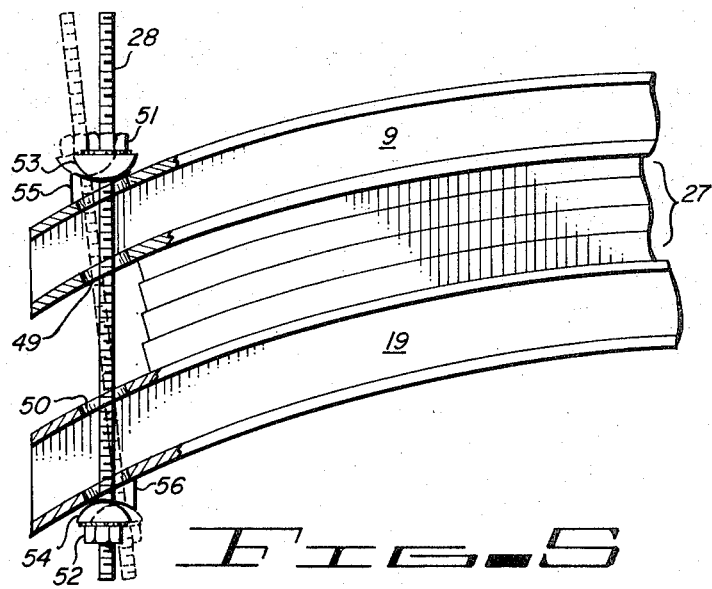
Fig-5
Fig-6
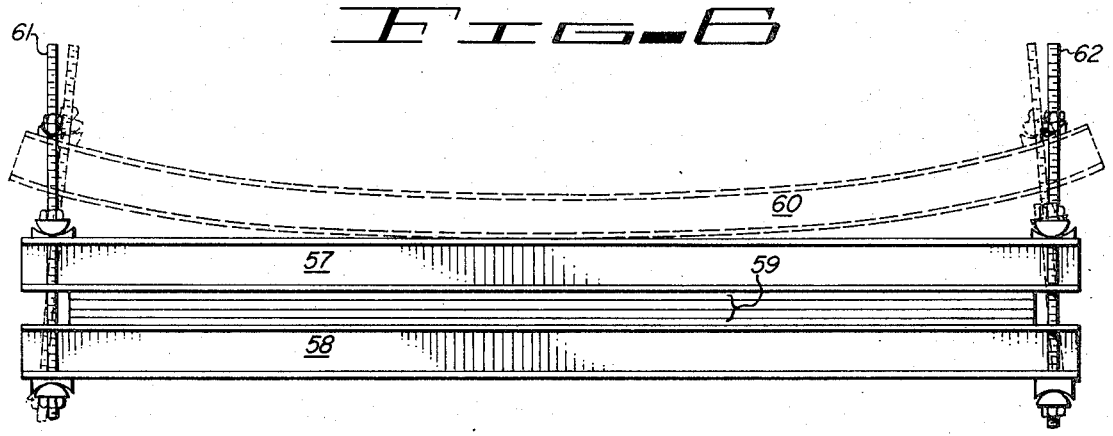

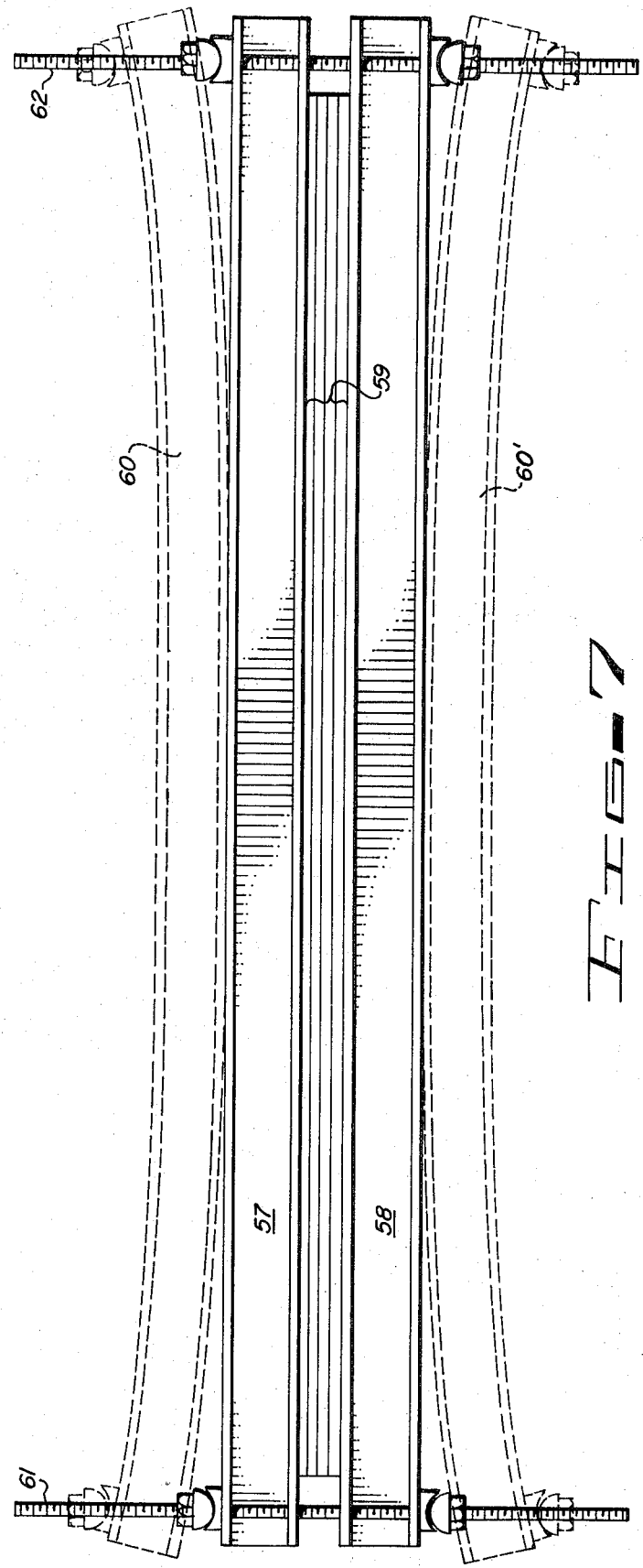

APPARATUS FOR LAMINATING WOODEN STRIPS

BACKGROUND OF THE INVENTION

The many advantages of laminated wooden beams as structural elements in building construction are widely recognized. Wood is light in weight relative to steel, and yet wood possesses great strength. While an unlaminated wooden beam may have one or more weak points due to knots or imperfections, such weak points are minimized in laminated beams because imperfections in the individual layers may be staggered along the length of the beam. The strength of a laminated beam is therefore several times as great as that of an unlaminated beam of the same dimensions. Laminated timber is easily worked with conventional hand tools and thus is easy to utilize. It is also relatively fire resistant and can be treated to repel insects, fungus and deterioration.

In the past, laminated wooden beams have been expensive to manufacture. A crew of several men have been required to cut, lay out, spice, glue, assemble and clamp the individual wood pieces needed for the lamination as well as trim and finish the beams. As a result of the high labor and handling costs, manufacturers have concentrated mainly on large laminated beams with lengths greater than 50 feet, using two-inch lamellae, while medium-size and smaller beams have not commonly been fabricated.

Modern automated methods of laminated beam construction are desirable, but it has been difficult to apply the assembly line techniques of mass production to beam manufacture. New chemical bonding glues have made laminated beams even more attractive to the building industry, but the beams are still being produced on an individual basis.

DESCRIPTION OF THE PRIOR ART

A number of methods and special apparatus have been proposed and employed in the fabrication of curved or specially shaped laminated beams.

U.S. Pat. No. 2,567,122, granted to W. E. Radig, discloses an apparatus for the shaping of laminated plywood into the form of a three-sided channel. An inner form has the dimensions desired for the inside dimensions of the channel. A flexible steel band presses the plywood against the fixed inner form. Three shaped blocks interposed between the band and the plywood permit a more even distribution of forces to the plywood as the surrounding steel band is tightened against the blocks. A screw and clamping mechanism is employed to apply tension to the steel band.

U.S. Pat. No. 99,925, granted to J. W. Martin, discloses a wood bending machine. This apparatus was especially designed for the shaping of wood stock into the shape of a handle for a cane or the like. The wood stock was in this case pressed against a fixed inner form member by a surrounding flexible chain which applied pressure against the stock as the chain was tightened about it in tension. Tension was applied by means of a lever arm.

The Porter, Goodman and Dickason structure disclosed in U.S. Pat. No. 1,174,276 uses a screw clamp for assembling wooden silo sections from tongue-and-groove wooden staves. A steel rod in tension applied by means of a threaded crank at one end of the rod holds the staves together while they are secured to supporting members.

U.S. Pat. No. 2,168,280, granted to H. Klemm, discloses an apparatus for the manufacture of laminated wooden skis. Individual clamping members tightened by screws are distributed along the length of the stacked laminar strips. As the screws are tightened the stacked laminations are pressed against a fixed form of the desired shape.

SUMMARY OF THE INVENTION

In accordance with the invention claimed an improved apparatus is provided for the forming and manufacture of laminated wooden beams.

Another object of the invention is to provide an apparatus for forming laminated wooden beams which can be operated by only one or two men.

A further object of the invention is to provide an apparatus for the forming of laminated wooden beams which will permit the uniform application of pressure along the entire length of the beam.

A still further object of the invention is to provide an apparatus for the forming of laminated wooden beams which will permit the independent adjustment of pressure at individual pressure points along the length of the beam.

A still further object of the invention is to provide an apparatus for the forming of laminated wooden beams which is adaptable to the fabrication of straight or curved beams.

A still further object of the invention is to provide an apparatus for the forming of laminated wooden beams which permits the fabrication of laminated beams of different lengths using the same apparatus.

A still further object of the invention is to provide an apparatus for the forming of laminated wood beams which permits the forming of two or more beams at a time.

A still further object of the invention is to provide an apparatus which permits the fabrication of laminated wooden beams at low cost.

Further objects and advantages of the invention will become apparent as the following description proceeds, and the features of novelty which characterize this invention will be pointed out with particularity in the claims annexed to and forming part of this specification.

BRIEF DESCRIPTION OF THE DRAWINGS

The present invention may be more readily described by reference to the accompanying drawing, in which:

FIG. 1 is a perspective view showing a freshly glued laminated wooden beam being formed by the apparatus described in this specification.

FIG. 2 shows a segment of the elastic clamping beam on which is mounted a sliding or adjustable pressure block; the clamping beam and pressure block are a part of the apparatus shown in FIG. 1.

FIG. 3 shows two laminated wooden beams being formed simultaneously in the apparatus of FIG. 1.

FIG. 4 is an enlarged cross-sectional view of the laminated beams and the clamping beams taken along line 4—4 of FIG. 3.

FIG. 5 is an enlarged partial view of one of the pressure application screws illustrated in FIGS. 1 and 3 showing the screw penetrating the clamping beams through slot-type holes.

FIG. 6 shows a modification of the apparatus adapted for the forming of straight rather than curved laminated beams by using a straight, rigid frame and an initially curved elastic beam.

FIG. 7 is a further modification of the apparatus shown in FIGS. 1–6 employing two elastic beams.

DESCRIPTION OF THE PREFERRED EMBODIMENT

Referring more particularly to the drawings by characters of reference, FIG. 1 discloses an apparatus for forming curved laminated wooden beams comprising a supporting base, a rigid frame 8 and an elastic beam 9. The supporting base 7 is comprised of two longitudinal members 10 and 11 and a number of lateral members 12, 13, 14, 15, 16, 17 and 18. Rigid frame 8 is comprised of a supporting beam 20, struts 21, 22, 23, 24 and 25, and a curved member 19. Curved member 19 is rigidly set in the form of an arch or arcuate configuration having the curvature nearly that desired in the finished laminated beam. The freshly glued laminated beam 27 is placed between curved member 19 and elastic beam 9. Clamping bolts 28, 29, 30 and 31 are tightened, beam 9 moves toward laminated beam 27 and first pressure point between beam 9 and beam 27 is established near the center of beam 27.

The forces applied to elastic beam 9 are located near both ends where pressure is applied by the clamping bolts 28, 29, 30 and 31. These applied forces in combination with the reaction force of the beam 19 acting against elastic beam 9 at its center set up a bending moment in elastic beam 9. As the clamping screws 28–31 are tightened, the center of the laminated beams 27 is pressed against the center of curved member 19 by the center of elastic beam 9. As the clamping pressure increases the contact surface area has spread from the center in a sweeping action to both ends of beam 27 at which time the elastic beam 9 will have taken the curvature of member 19. With proper design of the apparatus and assuming uniformity of the beam 27, the bending moment in elastic beam 9 will at this time be essentially uniform over the length of beam 9, and, as a consequence, the pressure exerted by beam 9 against beam 27 will also be uniform along its length.

The establishment of the first pressure point near the center helps to hold the laminated strips in place as pressure is first applied. It will be appreciated that no longitudinal motion necessarily occurs between mating glued surfaces of the individual laminated strips at the center of beam 27, but as the beam is formed into an arch the longitudinal motion between these mating surfaces increases from zero at the center to a maximum at the ends. The spreading of the pressure over the contact surface area from the center to the ends as described earlier accomodates this longitudinal displacement between the glued surfaces of the laminations.

Because the elastic clamping beam and/or the laminated beam may not be perfectly uniform over their entire lengths, it is desirable to be able to control or adjust pressure at individual pressure points along the length of the beam 27. For this reason, a number of movable pressure pads or blocks 35–45 are fitted to curved member 19 and elastic beam 9. An enlarged view of one of these pressure blocks 35 mounted on elastic beam 9 is shown in FIG. 2. Pressure block 35 is fashioned from steel and is shaped to the surface of elastic beam 9 or member 19 while wrapping around the edges of beam 9 or member 19 gripping with adequate pressure to insure proper orientation but loosely enough to permit lateral adjustment of its position along the length of elastic beam 9 or member 19. With the use of these pressure blocks, pressure is no longer applied uniformly over the surface of the beam 27 but rather at discrete pressure points established at the locations of the pressure blocks. The positions of individual blocks may thus be adjusted to compensate for any nonuniformities in the elastic beam 9.

FIG. 3 shows how the apparatus of FIG. 1 may be employed to form two laminated beams at one time. Two laminated beams 47 and 48 are placed between elastic beam 9 and rigid frame member 19. A spacer 46 is placed between beams 47 and 48. Spacer 46 acts like any one of the laminations of the beams being formed except that its contact surfaces are not glued.

A cross-sectional view of FIG. 3 taken along the line 4–4 is shown in FIG. 4 where it is seen that both elastic beam 9 and member 19 are in this case constructed in the form of curved I-beams for added strength. Laminated beams 47 and 48 comprise stacked strips of laminations. Glue is applied to mating surfaces of these laminations prior to the forming operation. Clamping pressure is not removed until the glue has been allowed to dry and cure.

FIG. 5 shows details of the clamping bolts and their relationship with elastic beam 9 and rigid frame member 19.

Clamping bolt 28 passes through slot-type holes 49 and 50 in elastic beam 9 and member 19. Threaded nuts 51 and 52 are screwed against semi-cylindrical blocks 53 and 54. Blocks 53 and 54 bear against pillow blocks 55 and 56 formed on the surfaces of elastic beam 9 and member 19 as the nuts 51 and 52 are tightened to exert pressure on beam 27. Slot-type holes 49 and 50 allow clamping bolt 28 to tip as shown by the dash line image of the clamping bolt when elastic beam 9 is deflected downward by pressure applied at clamping bolt 28. The slotted holes 49 and 50 thus prevent binding and distortion of clamping bolt 28 and insure a smooth and uninhibited clamping action.

FIG. 6 shows an adaptation of the apparatus of FIG. 1 for use in forming straight laminated beams. In FIG. 6, a stack of laminations 59 is placed between rigid frame member 58 and elastic beam 57. Both member 58 and beam 57 are shown as having the form of I-beams, although it must be understood that frame member 58 must be held straight by a means not shown. A dash-line image 60 of beam 57 is shown as a curved member. Elastic beam 57 in this adaptation of the apparatus has a curved form as shown by the dash-line image 60 prior to application of the clamping forces by clamping bolts 61 and 62. When full clamping pressure is applied, elastic beam 57 is straightened, as shown, and is thus stressed by a bending moment along its entire length. As a consequence, pressure is applied uniformly along the length of stack 59 by beam 47 as discussed earlier in the explanation of the forming of curved beams.

The apparatus of FIG. 1 may be employed to form laminated beams of lengths shorter than that of beam 27. For this purpose, additional pillow blocks 63 and 64 are attached to elastic beam 9 for mounting the clamping bolts 28, 29, 30 and 31. Clearance holes 65 and 66 and mounting holes 67, 68, 69 and 70 are also provided to receive the clamping bolts for such use. In addition, beams of various cross-sectional configurations may be formed such as, for example, laminated beams of trapezoidal cross-sectional configuration.

A variation of the apparatus falling within the scope of the invention involves the use of a hinge securing one end of elastic beam 9 to curved member 19. The use of a hinge in this manner retains the elastic beam 9 in relative position and reduces the time required for tightening the clamping bolts, thus reducing the cost of the operation.

Another variation of the apparatus falling within the scope of the invention is the use of pressure blocks which can be adjusted in position but which are also adjustable in height. A screw-type adjustment could readily be employed for adjusting height. Addition of this feature would simplify the task of achieving the desired pressure pattern along the length of the beam. The use of adjustable height in the pressure blocks can be employed if desired to produce a difference in curvature in either the rigid frame and the elastic beam.

Yet another variation of the apparatus falling within the scope of the invention is the use of large movable brackets that can be rigidly fastened to base 7, said brackets positioned to outline the form of the finally laminated beam. These brackets serve the same purpose as rigid frame member 19 with pressure blocks.

Yet another variation of the apparatus falling within the scope of the invention is the use of an elastic beam in place of the rigid frame previously described. This embodiment has the same advantages of the rigid frame except that the final radius of curvature of the three juxtaposed beams in the clamped position will not be as simple to control as in the rigid frame structure.

FIG. 7 shows an adaptation of the apparatus of FIG. 1 for use in forming straight laminated beams. In FIG. 7, a stack of laminations 59 is placed between elastic beams 57 and 58. Dash-line images 60 and 60' of beams 57 and 58 are shown as curved members. Beams 57 and 58 have curved forms as shown by the dash-line images 60 and 60' prior to application of the clamping forces by clamping bolts 61 and 62. When full clamping pressure is applied, beams 57 and 58 are straightened, as shown, and are thus stressed by a bending moment along their entire lengths.

Although but a few embodiments of the present invention have been illustrated and described, it will be apparent to those skilled in the art that various changes and modifications may be made therein without departing from the spirit of the invention or from the scope of the appended claims.

What is claimed is:

1. An apparatus for uniting and shaping in one operation adherent layers of freshly glued laminated wooden strips into a beam, said apparatus comprising:
   a base,
   a rigid frame mounted on said base used as a forming surface against which the layers of laminated wooden strips are juxtaposed thereto,
   an arcuate-shaped elastic beam mounted on said base for movement into juxaposed relationship with the layers of laminated wooden strips positioned adjacent said frame,
   said elastic beam being formed for engaging pressure first on a position between the ends of the laminated wooden strips and thereafter progressively toward both ends of the laminated wooden strips, and
   releasable clamping means extending between the ends of said frame and the ends of said elastic beam for producing clamping pressure on said laminated wooden strips,
   said clamping means causing longitudinal movement of said laminated wooden strips relative to each other progressively from the initial contact point of the elastic beam on the laminated wooden strips toward their ends, and
   said elastic beam when tightly engaging the ends of the laminated wooden strips and assuming substantially the configuration of the rigid frame applying equal pressure to the laminated wooden strips along their length.

2. The apparatus set forth in claim 1 wherein:
   said rigid frame is of an arcuate configuration, and
   the initial radius of curvature of said elastic beam is different from that of said rigid frame.

3. The apparatus set forth in claim 1 in further combination with:
   a plurality of pressure pads spaced along the length of said elastic beam for engaging the juxtaposed surface of the laminated beam for applying pressure at given points along the length of the laminated beam.

4. The apparatus set forth in claim 3 wherein:
   said pressure pads are adjustable in position along the length of said elastic beam.

5. The apparatus set forth in claim 3 wherein:
   said pressure pads are spaced along said frame to extend between said frame and the juxaposed beam.

6. The apparatus set forth in claim 3 in further combination with:
   a second plurality of pressure pads spaced along the length of said frame for engaging the juxaposed surface of the beam for applying pressure to the beam at discrete points along its length.

7. The apparatus set forth in claim 1 wherein:
   said rigid frame is of a straight configuration and said elastic beam has an arcuate configuration.

8. The apparatus set forth in claim 1 wherein:
   said releasable clamping means comprises a pair of nuts and bolts one at each end of said apparatus and extending between slot-type holes in said frame and said elastic beam, permitting deflection of said bolts along the length of said frame.

9. A method of forming laminated wooden beams comprising the steps of:
   juxtaposing freshly glued wooden laminated strips to form a beam,
   juxtaposing one surface of said beam to a rigid frame having a given configuration,
   moving a curved surface of an elastic beam into contact with said beam on the opposite surface to that engaging said frame, and
   applying pressure between the ends of said elastic beam and the ends of said frame, causing longitudinal movement of said strips relative to each other until said elastic beam applies equal pressure to said laminated beam along its length.

10. The method set forth in claim 9 wherein:
    said one surface of said beam is juxtaposed to a rigid frame having an arcuate configuration, and the underside of the curved surface of the elastic beam is brought initially in contact with the beam between its ends.

11. The method set forth in claim 9 in further combination with the step of:

juxtaposing the freshly glued wooden laminated strips of two beams separated by a spacer to said rigid frame.

12. The method set forth in claim 9 in further combination with the steps of:

placing a plurality of pads at selected points along the elastic beam for applying pressure of equal values at discrete points along the laminated beam as pressure is applied between the ends of said elastic beam and the end of said frame.

13. The method set forth in claim 9 in further combination with:

an initially straight elastic beam used in conjunction with an arcuate frame.

14. The method set forth in claim 3 in which the pressure pads are shaped so as to transversely align the strips of the laminated beam.

15. The apparatus set forth in claim 1 wherein:

said rigid frame is replaced with an elastic beam.

16. The method set forth in claim 9 wherein:

said juxtaposing freshly glued wooden laminated strips are positioned with one surface adjacent an elastic beam.

* * * * *